March 11, 1969
B. J. DE BUSK
3,432,052
TRACTOR HANDY BOX
Filed July 18, 1966
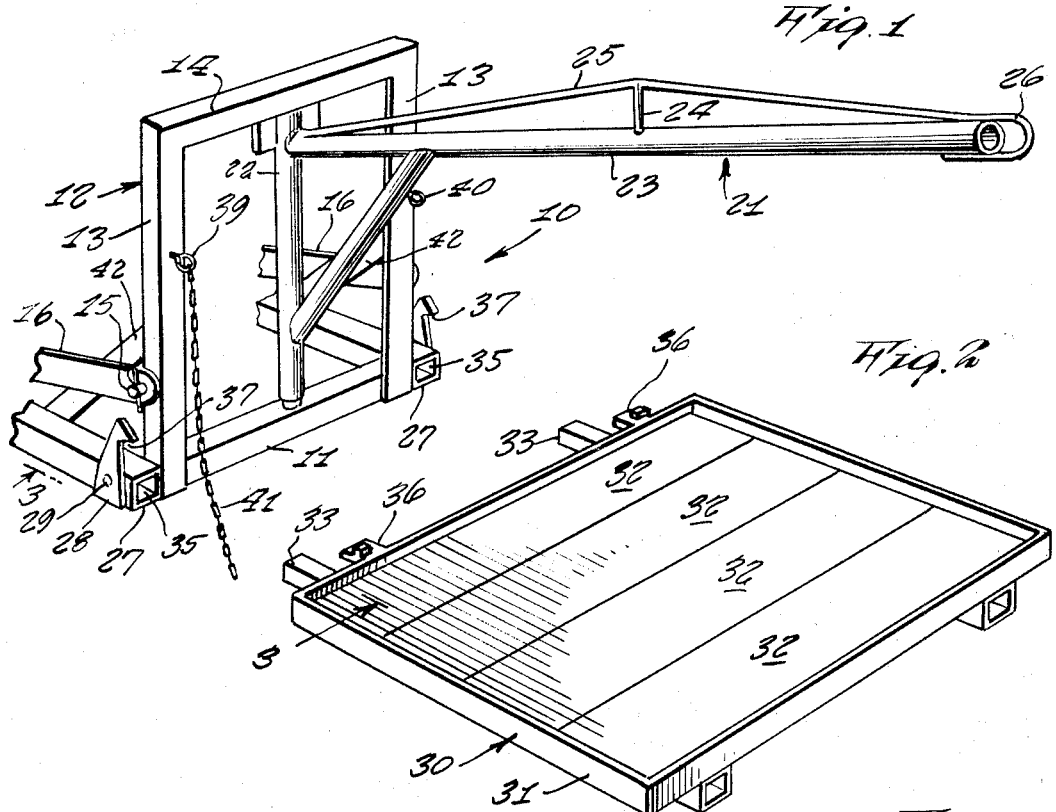
INVENTOR
BILL J. DeBUSK

United States Patent Office 3,432,052
Patented Mar. 11, 1969

3,432,052
TRACTOR HANDY BOX
Bill J. DeBusk, Rte. 1, Midway, Tenn. 37809
Filed July 18, 1966, Ser. No. 565,886
U.S. Cl. 214—501     2 Claims
Int. Cl. B60p *1/04, 1/46*

ABSTRACT OF THE DISCLOSURE

A removable flat bed securable to the rear of a tractor, a manually operative lever for dumping the flat bed and a rearwardly extending boom used for raising objects from the ground and placing them upon the flat dump bed.

---

This invention relates generally to tractor accessories. More specifically it relates to accessories which are attachable to the rear of a tractor for the purpose of performing additional functions.

A principal object of the present invention is to provide an attachment for a tractor which increases the utility thereof by providing the same with means for transporting various loads from place to place.

Another object of the present invention is to provide a tractor attachment which incorporates a removable flat bed upon which various objects may be placed for the purpose of transportation.

Yet another object of the present invention is to provide a tractor attachment having self-contained means whereby the flat bed may be dumped, the same being accomplished by a manually operable lever.

Yet another object is to provide a tractor attachment which incorporates a rearwardly extending boom for the purpose of providing means for raising an object from the ground and placing it upon the flat dump bed.

Other objects of the present invention are to provide a tractor attachment which is simple in design, inexpensive to manufacture, rugged in construction, easy to use and efficient in operation.

These and other objects will be readily evident upon a study of the following specification and accompanying drawing wherein FIGURE 1 is a rear perspective view of the present invention shown without the flat bed attached thereto, FIGURE 2 is a perspective view of the flat dump bed, FIGURE 3 is an enlarged fragmentary cross sectional view taken on the line 3—3 of FIGURE 1, and FIGURE 4 is a fragmentary rear elevation view of the structure shown in FIGURE 1.

Referring now to the drawing in detail, the numeral 10 represents a tractor attachment according to the present invention wherein there is a base frame 11 made preferably from angle iron and to which there is secured an upstanding frame 12 of generally rectangular configuration. The frame 12 includes a pair of upstanding parallel angle irons 13 connected across the upper ends by a horizontal angle iron 14.

A pin 15 is secured to each of the upstanding angle irons 13 and one end of a link 16 is secured thereto, the opposite end of the link being secured upon the rear of the tractor 17.

An upstanding post 18 is centrally mounted upon the base frame 11, and a pair of angle irons 19 in spaced apart relation, and supporting a pair of cross pins 20 therebetween are mounted in depending position upon the lower side of the angle iron 14. A boom assembly 21 is supported upon post 18 and upon the pins 20 between the angle irons 19.

The boom assembly 21 includes an upright pipe 22 the lower end of which is fitted over the post 18 and the upper end thereof receiving the pins 20 therethrough, the pipe 22 having a rearwardly extending boom 23 secured thereto near its upper end. The boom is comprised of a black iron pipe having an upstanding rod 24 secured thereto midway between its opposite ends, the rod 24 having an iron rod support 25 secured to the upper end of the rod 24, the iron rod support being connected at one end to the end of the boom which is adjacent to pipe 22, and the opposite end of the iron rod support being secured to the opposite end of the boom where the iron rod support is of U-shape configuration to form an end loop 26. The end loop provides a means for hooking a block thereto or passing a hook therethrough for purpose of raising an object from the ground and placing it upon a flat dump bed which will be described hereafter.

A sill 27, formed from a pair of angle irons, is secured adjacent each end of the frame 11, the sills extending forwardly, and each sill being connected by a diagonal brace 42 to one of the vertical angle irons 13 for purpose of providing a strong construction. A pawl or trip-anchor 28 is mounted pivotally free upon a pin 29 secured to each of the sills, as shown in FIGURES 1 and 4 of the drawing.

A flat dump bed 30, shown in FIGURE 2, is comprised of a rectangular frame 31 made from angle irons upon which there are supported a plurality of wooden boards 32, the flat dump bed having a pair of rearwardly extending bars 33 attached pivotally thereto by means of hinges 34. The bars 33 are receivable within openings 35 in each of the sills. A pair of lugs 36 are rigidly secured to the rear side of the flat bed frame 31, the lugs 36 being receivable under the hook 37 of the trip-anchor or pawl. When the lugs are received under the hooks 37, the flat dump bed is in a horizontal position as is shown in FIGURE 3 of the drawing. A manually operable lever 38 provides means for tripping the pawls and release the hold thereof upon the lugs 36 thereby causing the flat bed to be dumped as is shown in dotted lines in FIGURE 3.

A pair of eye-bolts 39 and 40 are secured to the vertical angle irons 13 of the upstanding frame 12, the eye-bolt 39 having one end of a chain 41 secured thereto, the opposite end of the chain being securable to the eye-bolt 40, the eye-bolts and chain providing a means for securing an object placed upon the flat bed and preventing the same from falling off during transportation.

In operative use the flat bed is secured to the sills and retained by means of the trip-anchors or pawls. A block or rope secured or passed through the loop 26 provides a means for raising various objects from the ground and placing them upon the flat bed 30. When it is desired to dump the load the operator upon the tractor merely moves the lever 38 so as to trip the pawls and release their hold upon the lugs 36 causing thereby the dump bed to be moved about hinges 34, thereby unloading the objects carried upon the same.

I claim:

1. In a tractor attachment, the combination of a horizontal base frame, an upstanding frame secured to said base frame, said upstanding frame and said base frame providing a means for supporting a rearward extending boom assembly, a forward extending sill secured to each end of said base frame, support means between said upstanding frame and a tractor, and a flat dump bed removably attached to each of said sills, said means for supporting said boom assembly comprising an upstanding post secured to the center of said base frame, a pair of spaced apart angle irons secured to the underside of an upper horizontal member of said upstanding frame, a pair of pins between said angle irons, said pins and said posts supporting a pipe on said boom assembly, the lower end of said pipe being receivable over said post, the upper end of said pipe having means for receiving said pins therethrough, a rearwardly extending boom secured at its one end to an upper portion of said pipe, an upstanding rod centrally mounted between opposite longitudinal ends of said boom and an iron rod support secured at one end to a forward end of said boom, said iron rod support being secured over the upper end of said upstanding rod, and the opposite end of said iron rod support being secured to the rear end of said boom, said iron rod support at the rear end of said boom forming an end loop.

2. The combination as set forth in claim 1 wherein said flat bed comprises a rectangular frame of angle irons supporting a plurality of boards and a pair of forwardly extending rods hingedly secured to said flat bed and receivable within said sills and a pair of lugs receivable under hooks on a pair of pawls.

References Cited

UNITED STATES PATENTS

| 1,630,398 | 5/1927 | McDevitt | 214—501 |
| 1,860,774 | 5/1932 | Erickson. | |
| 2,560,570 | 7/1951 | Harig. | |
| 2,639,048 | 5/1953 | Glashaw. | |
| 3,103,290 | 9/1963 | Perri | 214—501 XR |

ROBERT G. SHERIDAN, *Primary Examiner.*

U.S. Cl. X.R.

214—75